United States Patent Office 3,141,863
Patented July 21, 1964

3,141,863
RESIN COMPOSITION AND PROCESS
Roy T. Holm, Orinda, Calif., assignor to Shell Oil Company, New York, N.Y., a corporation of Delaware
No Drawing. Filed Mar. 21, 1960, Ser. No. 16,171
10 Claims. (Cl. 260—47)

This invention relates to novel resinous polycarbonate esters and methods for producing them.

Polycarbonates are a known family of resins which are characterized by having the carbonate group

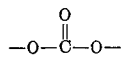

present as the connecting link between monomer units. Several methods of preparing polycarbonates have been proposed. The resin can be produced, for example, by an ester exchange reaction in which a carbonate diester and a dihydric phenol or alcohol are interreacted. Another method of preparation comprises the addition of phosgene to a dihydric phenol or glycol in the presence of a hydrogen chloride-accepting medium such as sodium hydroxide or pyridine. It has also been proposed to form polycarbonate resins by first producing an epoxy ester of a carbonic acid by interreacting an alcohol containing a vicinal epoxy group with a carbonic acid, carbonic acid monohalide, or acid ester of carbonic acid in the presence of a hydrogen halide-accepting basic compound and then catalyzing the polymerization of the epoxy ester by use of certain catalytic materials such as acids, anhydrides and primary and secondary amines.

It has now been found that novel highly polymeric linear polycarbonate resins can be simply and conveniently prepared by reacting a di-vic-epoxide, preferably one from the group consisting of diglycidyl ether and diglycidyl ethers of dihydric phenols and dihydric alcohols, with phosgene in an approximately equimolar ratio in the presence of a small amount of a basic compound as catalyst and in the absence of substantial amounts of hydrogen halide-accepting compounds.

The novel polymers produced by carrying out the just described polymerization process are characterized by a high degree of linearity and a substantial chlorine content. The polymers of this invention are linear polymers whose repeating unit is

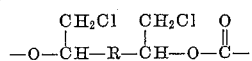

wherein R represents the portion of the di-vic-epoxide monomer which lies between the epoxide groups. In the preferred case, the di-vic-epoxide is diglycidyl ether or a diglycidyl ether of a dihydric phenol or alcohol. The general formula for polycarbonates of this invention which are derived from diglycidyl ethers is

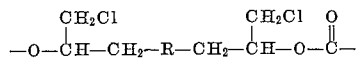

wherein R is oxygen or the divalent residue of a dihydric compound such as phenol or glycol, including the oxygens of the hydroxy groups. To illustrate, in the case where the monomer used in preparing the resin is 2,2-bis(2,3-epoxypropoxyphenyl)propane, "R," above, represents the group

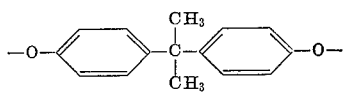

It is an object of this invention to provide a simple method for producing linear polycarbonate resins from a diepoxide and phosgene. It is another object to provide novel polycarbonate resins characterized, i.a., by chloromethyl side chains. Other objects will become apparent from the following description of this invention.

The polycarbonate esters produced in accordance with this invention have molecular weights of about 2000 and higher and typically in the range from 5,000 to 15,000. They are rather tough resins which may be hard or somewhat rubbery, depending on the reactants and reaction conditions under which they are produced. They are generally clear and colorless.

The resins according to this invention are suitable for use as adhesives, surface coatings and molding compounds for the production of various products such as containers for electrical equipment, small machine parts, toys and the like. A particularly useful property of the resins of this invention is their flame resistance and self extinguishing characteristic. Resins produced according to this invention may be compounded in known manner with various auxiliary materials such as fillers, plasticizers or other resins in order to obtain modified properties.

The reaction of this invention is generally exothermic, at least during the initial stages. It is therefore preferred to cool the reaction mixture during the initial stages of the reaction and to mix the reactants by adding one of the reactants gradually to a solution containing the other reactant and the catalyst. Either the phosgene or the di-vic-epoxide reactant may be the one that is added gradually. It is generally preferred to add the phosgene, which may be bubbled in in the form of a gas or added gradually in solution in a suitable solvent.

The reaction temperature during the initial stages is preferably maintained below 25° C. and most suitable between 0° and 10° C. During subsequent stages of the reaction the temperature may be raised to room temperature or to a slightly elevated temperature, e.g. 25° to 50° C.

The reaction is carried out in the presence of the solvent which permits the reactants as well as the resinous reaction product to remain in solution. Suitable solvents are chlorinated hydrocarbons, e.g., methylene chloride, ethylene chloride and chlorobenzene. Other solvents may be used such as dioxane, tetrahydrofuran, methyl ethyl ketone, etc.

The reaction requires the presence of a small amount of a basic catalyst. Suitable catalysts are pyridine, dimethylbenzyl amine, triethylamine, tributylamine and other tertiary amines. Since these catalysts can also act as hydrogen halide acceptors it is preferred that they be present only in very small concentrations since otherwise the course of the reaction will be changed. The catalyst concentration is suitably in the range from 0.01 to 0.5% by weight of the total reaction mixture. If desired, the catalyst may be added in the form of a hydrogen halide salt.

In the production of polycarbonate resins according to this invention the carbonate group is introduced by use of phosgene ($COCl_2$) as one of the reactants.

The other reactant is a di-vic-epoxide. Members of the group consisting of diglycidyl ether, i.e.

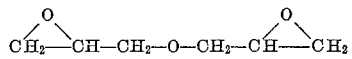

and diglycidyl ethers of dihydric phenols and dihydric alcohols, are especially preferred. The general formula for suitable diglycidyl ether reactants can be written

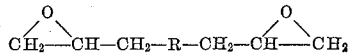

wherein R may be oxygen or the divalent residue of a dihydric phenol or alcohol, including the oxygen of the hydroxyl groups. Preferred diglycidyl ethers for preparing resins of this invention are diglycidyl ether itself, the diglycidyl ether of resorcinol and 2,2-bis(2,3-epoxypropoxyphenyl)propane, which is the diglycidyl ether of 2,2-bis(4-hydroxyphenyl)propane, commonly known as p,p'-bisphenol A.

The diglycidyl ethers of dihydric phenols and dihydric alcohols are prepared in known manner by reaction of the dihydric compound with an equimolar amount of epichlorohydrin in the presence of a hydrogen chloride accepting compound. Such preparations are described for example in U.S. 2,467,171 to Werner et al. and U.S. 2,651,589 to Shokal et al. Other methods of preparation may be employed if desired.

Suitable dihydric phenols from which the diglycidyl ethers are derived include the monocyclic compounds resorcinol and hydroquinone which carry the hydroxyl groups in the meta and para positions, respectively. The compounds may also contain halogens in the nucleus if desired. Preferred dihydric phenols are those containing two uncondensed benzene rings, e.g., 4,4'-dihydroxydiphenyl and its derivatives containing, for example, halogens in the nucleus or containing alkyl groups in the nucleus which have preferably no more than 4 carbon atoms per group. Other dihydroxydiphenyls that may be used are those having the hydroxy groups in the 2,4' and 3,3' position. The diglycidyl ether of compounds having both hydroxy groups in the ortho position, e.g., 2,2'-dihydroxydiphenyl, is less suitable.

Other suitable dihydric phenols whose diglycidyl ethers are useful are those of which 4,4'-dihydroxydibenzyl is typical. Its halogen and alkyl derivatives may also be used as well as its position insomers.

The particularly preferred diglycidyl ether is that of p,p'-bisphenol A, mentioned above. The bisphenol itself is prepared from phenol and acetone in known manner. The position isomers which are described, for example, in U.S. 2,506,486 to Bender et al., may also be employed. These compounds may also contain halogen or alkyl group substituents in the nucleus. The alkyl groups preferably have no more than 4 carbon atoms per group. Besides bisphenol A one may also employ the bisphenols produced by reacting phenol with other ketones and aldehydes. Some of these are mentioned, for example, in column 5 of U.S. 2,590,059 to Winkler. Still other dihydric phenols are known and may suitably be employed. A large number of them are described, for example, in chapter IV of "Epoxydverbindungen and Epoxyharze" by A. M. Paquin, Springer-Verlag, 1958, pages 256–307.

Suitable dihydric alcohols from which diglycidyl ethers can be prepared, are ethylene glycol, diethylene glycol, triethylene glycol, polyethylene glycols, propylene glycol, isobutylene glycol, trimethylene glycol, 1,4-butanediol, 1,3-xylylene glycol, 1,4-xylylene glycol, bis(hydroxymethyl)durene and numerous other dihydric aliphatic and aryl substituted alcohols.

Other di-vic-epoxides which can also be employed as reactants include, for example, butadiene diepoxide, limonene diepoxide, dicyclopentadiene diepoxide, 1,5-diepoxyhexane, vinyl cyclohexene diepoxide and diglycidyl benzene.

These and still other useful di-vic-epoxides are discussed in more detail in chapter I of the above-referred to book by A. M. Paquin, particularly on pages 125–136.

It is preferred to employ the reactants in an approximately equimolar ratio of di-vic-epoxide to phosgene. This ratio tends to yield the highest molecular weight products. Useful results are also obtained, however, at di-vic-epoxide to phosgene molar ratios of from about 0.9:1 to 1.1:1 and even at somewhat lower and higher ratios.

The following examples illustrate the manner in which this invention is carried out. The examples are for the purpose of illustration only and the invention is not to be regarded as limited to any of the specific materials or conditions described but only by the appended claims.

EXAMPLE 1

*Reaction of Diglycidyl Ether and Phosgene*

A solution of 13 grams (0.1 mole) of diglycidyl ether in 100 milliliters of methylene chloride was placed in a vessel and cooled in an ice bath. One drop of pyridine was added to the solution and 12 grams (0.12 mol) of phosgene was slowly bubbled into the solution over a period of one and one-half hours while the mixture was maintained at 3° C. The mixture was then allowed to warm to room temperature and stirred for 3 hours. It remained at room temperature for an additional three days.

The colorless solution was evaporated at 40° C. under vacuum. The residue was 25 grams of cloudy, viscous syrup. The syrup was dissolved in 250 ml. of methylene chloride and washed four times with water containing sufficient isopropyl alcohol to resolve the emulsion. The third water wash was neutral. After drying over magnesium sulfate the clear solution was evaporated, leaving a very viscous syrup which was placed in a vacuum oven maintained at 70° C. and 2 mm. pressure for about 12 hours.

Analysis of the resulting product for carbon, hydrogen and chlorine yielded values which were in agreement with the following formula of the resulting product:

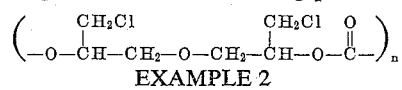

EXAMPLE 2

*Reaction of Resorcinol Diglycidyl Ether and Phosgene*

A solution of 11.1 grams (0.05 mol) of diglycidyl ether of resorcinol in methylene chloride was cooled in an ice bath. One drop of pyridine was added and a solution of 4.95 grams (0.05 mol) of phosgene and methylene chloride was added dropwise over a period of time. The temperature was kept in the range from 0 to 5° C. during addition. The temperature was then allowed to rise slowly to 37° C. and fall back to room temperature. The mixture was left for about 16 hours at room temperature. A small amount of sediment was then filtered out and the filtrate evaporated.

The residue was 16 grams of faintly cloudy colorless glassy solid that did not melt at steam temperature. This material was heated in an oil bath at 170° C. under vacuum, resulting in a nearly colorless fairly tough glassy solid that barely flowed at 170° C.

The resin was further purified by slowly pouring a methylene chloride solution of the resin into a large volume of ethyl ether and vacuum stripping the precipitate resulting light amber glassy material was found to have an elemental analysis substantially in agreement with the formula $C_{13}H_{14}O_5Cl_2$ and an intrinsic viscosity, measured in dioxane at 30° C. of 0.33. The resin was molded into a disc at 135° C. and 200 p.s.i.g. The disc was a clear pale amber color and showed fair toughness.

EXAMPLE 3

*Reaction of Diglycidyl Ether and Phosgene*

To a solution of 12.8 grams (0.13 mol) of phosgene in methylene chloride held at ice bath temperature, a drop of pyridine was added and 16.8 grams (0.13 mol) of freshly distilled diglycidyl ether was then slowly added while the temperature was kept between 5 and 10° C. After addition was completed the mixture was removed from the ice bath. The temperature slowly rose to 30° C. The solution was held at that temperature for two to three hours. The mixture was left at room temperature for 18 hours more.

After removal of solvent by vacuum stripping, the product was 29 grams of a dark brown, glassy resin that was slightly rubbery and elastic. The elemental analysis was in substantial agreement with the formula $C_7H_{10}O_4Cl_2$.

EXAMPLE 4

*Reaction of Diglycidyl Ether of Bisphenol A and Phosgene*

The resin was prepared from 35 grams (0.1 mol) of a commercial concentrate of diglycidyl ether of p,p'-bisphenol A, containing some higher molecular weight reaction product of bisphenol A and epichlorohydrin and 9.9 grams (0.1 mol) of phosgene. The reaction was carried out substantially in the manner of Example 2. The product, after stripping of solvent and heating under vacuum, was 43 grams of a glassy, reddish-brown resin.

EXAMPLE 5

*Test for Reaction in the Absence of Catalyst*

To a solution of 0.01 mol of diglycidyl ether of resorcinol dissolved in methylene chloride and held at 5° C. there was added a solution of 0.01 mol of phosgene in methylene chloride. The mixture was shaken and kept on an ice bath; no catalyst was added. In contrast to the previous experiments, in which there was substantial emission of heat, there was no exothermic effect in preparing this mixture. After standing at room temperature for two days the solution was stripped of methylene chloride on a steam bath. No solid reaction product was recovered.

EXAMPLE 6

Repeating Examples 1 and 2 with replacement of the diglycidyl ether and diglycidyl ether of resorcinol with an equal molar proportion of the diglycidyl ether of ethylene glycol, propylene glycol and 1,4-butanediol or with equal amounts of 1,5-diepoxyhexane or vinyl cyclohexene diepoxide, similar glassy, moderately tough resin products are obtained.

EXAMPLE 7

Resin produced according to Example 2 and according to Example 4 were used as adhesive between sheets of aluminum. It was found in each instance that the sheets were satisfactorily bonded. The resins have similarly useful adhesive properties when used in bonding surfaces of other metals and of wood and glass.

I claim as my invention:

1. The process of preparing a highly polymeric linear polycarbonate which comprises reacting a di-vic-epoxide with phosgene at a di-vic-epoxide-to-phosgene molar ratio of from about 0.9:1 to about 1.1:1, said reaction being carried out in the presence of from 0.01 to 0.5% by weight, based on the total reaction mixture, of a tertiary amine catalyst.

2. The process of preparing a highly polymeric linear polycarbonate which comprises reacting a di-vic-epoxide from the group consisting of diglycidyl ether and diglycidy ethers of dihydric phenols and dihydric alcohols with phosgene at an ether-to-phosgene molar ratio of from about 0.9:1 to about 1.1:1, said reaction being carried out in the presence of from 0.01 to 0.5% by weight, based on the total reaction mixture, of a tertiary amine catalyst.

3. The process according to claim 1 in which said di-vic-epoxide is diglycidyl ether.

4. The process according to claim 1 in which said di-vic-epoxide is 2,2-bis(2,3-epoxypropoxyphenyl)propane.

5. The process according to claim 1 in which said di-vic-epoxide is the diglycidyl ether of resorcinol.

6. The process according to claim 1 in which said di-vic-epoxide is the diglycidyl ether of ethylene glycol.

7. A linear polymer having a molecualr weight of at least 2000 and consisting of repeating units

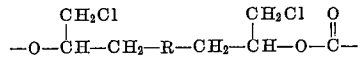

wherein R is a member of the group consisting of oxygen, the divalent radical resulting from removal of hydrogen from the two hydroxyl groups of a divalent phenol, and the divalent radical resulting from the removal of hydrogen from the two hydroxyl groups of a dihydric alcohol.

8. A linear polymer having a molecular weight of at least 2000 and consisting of repeating units

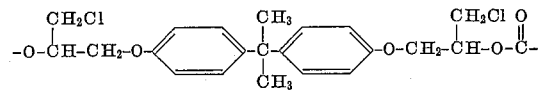

9. A linear polymer having a molecular weight of at least 2000 and consisting of repeating units

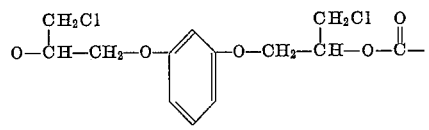

10. A linear polymer having a molecular weight of at least 2000 and consisting of repeating units

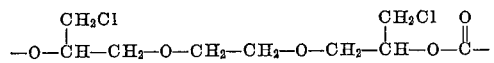

References Cited in the file of this patent

UNITED STATES PATENTS

| 2,370,568 | Muskat et al. | Feb. 27, 1945 |
| 2,795,572 | Mueller et al. | June 11, 1957 |

FOREIGN PATENTS

| 1,182,437 | France | June 25, 1959 |